US009942061B2

(12) United States Patent
Liu et al.

(10) Patent No.: US 9,942,061 B2
(45) Date of Patent: Apr. 10, 2018

(54) MULTIPATH SELECTION METHOD AND DEVICE, AND STORAGE MEDIUM (71) Applicant: Sanechips Technology Co., Ltd., Shenzhen (CN)

(72) Inventors: Zhongwei Liu, Shenzhen (CN); Ning Qiu, Shenzhen (CN); Haiyong Xiao, Shenzhen (CN); Yannan Xing, Shenzhen (CN)

(73) Assignee: Sanechips Technology Co., Ltd., Shenzhen (CN)

( * ) Notice: Subject to any disclaimer, the term of this patent is extended or adjusted under 35 U.S.C. 154(b) by 0 days.

(21) Appl. No.: 15/322,428

(22) PCT Filed: Oct. 9, 2014

(86) PCT No.: PCT/CN2014/088241
§ 371 (c)(1),
(2) Date: Feb. 16, 2017

(87) PCT Pub. No.: WO2016/000344
PCT Pub. Date: Jan. 7, 2016

(65) Prior Publication Data
US 2017/0207930 A1    Jul. 20, 2017

(30) Foreign Application Priority Data
Jun. 30, 2014    (CN) .......................... 2014 1 0307646

(51) Int. Cl.
*H04L 25/02* (2006.01)
*H04B 1/10* (2006.01)
(Continued)

(52) U.S. Cl.
CPC ....... *H04L 25/0202* (2013.01); *H04B 1/1081* (2013.01); *H04B 1/16* (2013.01); *H04B 17/345* (2015.01)

(58) Field of Classification Search
USPC .......................... 375/148, 355; 455/205, 411
See application file for complete search history.

(56) References Cited

U.S. PATENT DOCUMENTS 5,808,582 A * 9/1998 Woo ........................ G01S 19/22
342/357.61
7,042,862 B1 * 5/2006 Hirade ................. H04B 1/7075
370/335
(Continued)

FOREIGN PATENT DOCUMENTS

CN     1286534 A    3/2001
CN     1334997 A    2/2002
(Continued)

OTHER PUBLICATIONS

International Search Report in international application number: PCT/CN2014/088241, dated Mar. 30, 2015.
(Continued)

*Primary Examiner* — Eva Puente
(74) *Attorney, Agent, or Firm* — Oppedahl Patent Law Firm LLC (57) ABSTRACT Disclosed are a multipath selection method and device, and a storage medium. The method includes that: a correlation sequence between a received signal and a local reference signal is acquired by means of a correlation calculation method; a power spectrum of the correlation sequence and an average noise power of the received signal are acquired; according to the average noise power of the received signal, the power spectrum of the correlation sequence is divided into at least one first multipath component area and a second multipath component area according to a pre-set dividing rule; the at least one first multipath component area is searched according to a pre-set first noise threshold, so as to acquire a valid multipath component signal in the at least one first multipath component area; and the second multi-
(Continued)

path component area is searched according to a pre-set second noise threshold, so as to acquire a valid multipath component signal in the second multipath component area.

13 Claims, 3 Drawing Sheets

(51) Int. Cl.
*H04B 17/345* (2015.01)
*H04B 1/16* (2006.01)

(56) References Cited

U.S. PATENT DOCUMENTS

| | | | | |
|---|---|---|---|---|
| 8,248,997 B2* | 8/2012 | Charbit | ............... | G01S 5/0215 |
| | | | | 370/328 |
| 2003/0161390 A1* | 8/2003 | Teague | ............... | H04B 1/7117 |
| | | | | 375/148 |
| 2005/0259721 A1 | 11/2005 | Kawamoto | | |
| 2006/0068790 A1* | 3/2006 | Sawamoto | ........... | H04B 1/7113 |
| | | | | 455/441 |
| 2008/0253432 A1 | 10/2008 | Kawamoto | | |
| 2008/0317182 A1* | 12/2008 | Zhang | ............... | H04B 1/70757 |
| | | | | 375/355 |
| 2011/0274144 A1* | 11/2011 | Kent | ................... | H04B 1/7115 |
| | | | | 375/148 |
| 2014/0348215 A1* | 11/2014 | Rigolle | ............... | H04B 1/7113 |
| | | | | 375/148 |
| 2016/0180795 A1* | 6/2016 | Zhang | .................... | G09G 3/20 |
| | | | | 345/205 |

FOREIGN PATENT DOCUMENTS

| | | |
|---|---|---|
| CN | 1464638 A | 12/2003 |
| CN | 1697428 A | 11/2005 |
| CN | 101136651 A | 3/2008 |
| CN | 102377720 A | 3/2012 |
| EP | 1864459 A1 | 12/2007 |

OTHER PUBLICATIONS

English Translation of the Written Opinion of the International Search Authority in international application number: PCT/CN2014/088241, dated Mar. 30, 2015.

* cited by examiner

MULTIPATH SELECTION METHOD AND DEVICE, AND STORAGE MEDIUM

TECHNICAL FIELD

The disclosure relates to channel estimation technology, and in particular to a multipath selection method and device, and a storage medium.

BACKGROUND

In a wireless communication system, a wireless signal is transmitted from a base station, passing through a transmitting filter, a wireless fading channel, a receiving filter, to User Equipment (UE), so that a received signal received by the UE contains not only multipath components caused by the wireless fading channel, but also continuations of the multipath components caused by filtering processing of the filters.

In the conventional art, signal and noise for the multipath components are differentiated by setting a unified threshold. Thus, if the threshold is set too high or too low, it may be wrong to judge the signal and the noise, thereby reducing selection accuracy and Signal to Noise Ratio (SNR) of multipath components.

SUMMARY

For solving the above technical problems, the disclosure is intended to provide a multipath selection method and device, and a storage medium, which can improve selection accuracy and SNR of multipath components.

The technical solutions of the disclosure are implemented as follows.

In a first aspect, the disclosure provides a multipath selection method, including that:

a correlation sequence between a received signal and a local reference signal is acquired by means of a correlation calculation method;

a power spectrum of the correlation sequence and an average noise power of the received signal are acquired;

according to the average noise power of the received signal, the power spectrum of the correlation sequence is divided into at least one first multipath component area and a second multipath component area according to a pre-set dividing rule;

the at least one first multipath component area is searched according to a pre-set first noise threshold, so as to acquire a valid multipath component signal in the at least one first multipath component area; and the second multipath component area is searched according to a pre-set second noise threshold, so as to acquire a valid multipath component signal in the second multipath component area.

According to a first possible implementation mode and in combination with the first aspect, the step that according to the average noise power of the received signal, the power spectrum of the correlation sequence is divided into at least one first multipath component area and the second multipath component area according to the pre-set dividing rule includes that:

according to a pre-set determination policy, the ith first multipath component signal of the power spectrum of the correlation sequence is determined, wherein i denotes the sequence number of the first multipath component signal, and is a positive integer;

according to a pre-set selection policy, the ith first multipath component area corresponding to the ith first multipath component signal is determined; and the second multipath component area is acquired.

According to a second possible implementation mode and in combination with the first possible implementation mode, the pre-set determination policy includes that: when the ratio of the maximum power value of the power spectrum of the correlation sequence to the average noise power is greater than a first determination threshold TH1, or is less than the first determination threshold TH1 but greater than a second determination threshold TH2, or is less than the second determination threshold TH2 but greater than a third determination threshold TH3, the multipath component signal corresponding to the maximum power value of the power spectrum of the correlation sequence is the first multipath component signal; wherein, TH1>TH2>TH3>0;

the pre-set selection policy includes that: when the ratio of the power of the first multipath component signal to the average noise power is greater than the first determination threshold TH1, an area which centres on the first multipath component and has a width of $2 \times N_1 + 1$ is selected in the power spectrum of the correlation sequence as the first multipath component area corresponding to the first multipath component signal;

and, when the ratio of the power of the first multipath component signal to the average noise power is less than the first determination threshold TH1 but greater than the second determination threshold TH2, an area which centres on the first multipath component and has a width of $2 \times N_2 + 1$ is selected as the first multipath component area corresponding to the first multipath component signal;

and, when the ratio of the power of the first multipath component signal to the average noise power is less than the second determination threshold TH2 but greater than the third determination threshold TH3, an area which centres on the first multipath component and has a width of $2 \times N_3 + 1$ is selected as the first multipath component area corresponding to the first multipath component signal;

wherein, $N_1 > N_2 > N_3$, and all of the $N_1$, $N_2$ and $N_3$ are positive integers.

According to a third possible implementation mode and in combination with the first or the second possible implementation mode, the step that the ith first multipath component signal of the power spectrum of the correlation sequence is determined according to the pre-set determination policy includes that:

when i=1, the multipath component signal corresponding to the maximum power value of the power spectrum of the correlation sequence is determined as the ith first multipath component signal of the power spectrum of the correlation sequence according to the pre-set determination policy; and when i>1, after removing the first to the (i−1)th first multipath component areas in the power spectrum of the correlation sequence, in the remaining power spectrum of the correlation sequence, the multipath component signal corresponding to the maximum power value of the remaining power spectrum of the correlation sequence is determined as the ith first multipath component signal of the power spectrum of the correlation sequence according to the pre-set determination policy.

According to a fourth possible implementation mode and in combination with the first aspect, the step that the at least one first multipath component area is searched according to the pre-set first noise threshold, so as to acquire the valid multipath component signal in the at least one first multipath component area, and the second multipath component area is searched according to the pre-set second noise threshold, so as to acquire the valid multipath component signal in the second multipath component area includes that:

in the first multipath component area, the multipath component signal whose power is greater than the first noise threshold G1 is the valid multipath component signal, and the multipath component signal whose power is less than the first noise threshold G1 is an invalid multipath component signal;

in the second multipath component area, the multipath component signal whose power is greater than the second noise threshold G2 is the valid multipath component signal, and the multipath component signal whose power is less than the second noise threshold G2 is an invalid multipath component signal.

In a second aspect, the disclosure provides a multipath selection device including: an acquisition unit, a division unit and a path selection unit, wherein, the acquisition unit is configured to acquire the correlation sequence between the received signal and the local reference signal by means of the correlation calculation method, and acquire the power spectrum of the correlation sequence and the average noise power of the received signal;

the division unit is configured to, according to the average noise power of the received signal, divide the power spectrum of the correlation sequence into at least one first multipath component area and the second multipath component area according to the pre-set dividing rule; and the path selection unit is configured to search the at least one first multipath component area according to the pre-set first noise threshold, so as to acquire the valid multipath component signal in the at least one first multipath component area, and search the second multipath component area according to the pre-set second noise threshold, so as to acquire the valid multipath component signal in the second multipath component area.

According to the first possible implementation mode and in combination with the second aspect, the division unit includes: a determination subunit, a selection subunit and an acquisition subunit; wherein, the determination subunit is configured to, according to the pre-set determination policy, determine the ith first multipath component signal of the power spectrum of the correlation sequence, wherein i denotes the sequence number of the first multipath component signal, and is a positive integer;

the selection subunit is configured to, according to the pre-set selection policy, determine the ith first multipath component area corresponding to the ith first multipath component signal; and the acquisition subunit is configured to acquire the second multipath component area.

According to the second possible implementation mode and in combination with the first possible implementation mode, the pre-set determination policy includes that: when the ratio of the maximum power value of the power spectrum of the correlation sequence to the average noise power is greater than the first determination threshold TH1, or is less than the first determination threshold TH1 but greater than the second determination threshold TH2, or is less than the second determination threshold TH2 but greater than the third determination threshold TH3, the multipath component signal corresponding to the maximum power value of the power spectrum of the correlation sequence is the first multipath component signal; wherein, TH1>TH2>TH3>0;

the pre-set selection policy includes that: when the ratio of the power of the first multipath component signal to the average noise power is greater than the first determination threshold TH1, the area which centres on the first multipath component and has a width of $2\times N_1+1$ is selected in the power spectrum of the correlation sequence as the first multipath component area corresponding to the first multipath component signal;

and, when the ratio of the power of the first multipath component signal to the average noise power is less than the first determination threshold TH1 but greater than the second determination threshold TH2, the area which centres on the first multipath component and has a width of $2\times N_2+1$ is selected as the first multipath component area corresponding to the first multipath component signal;

and, when the ratio of the power of the first multipath component signal to the average noise power is less than the second determination threshold TH2 but greater than the third determination threshold TH3, the area which centres on the first multipath component and has a width of $2\times N_3+1$ is selected as the first multipath component area corresponding to the first multipath component signal;

wherein, $N_1>N_2>N_3$, and all of the $N_1$, $N_2$ and $N_3$ are positive integers.

According to the third possible implementation mode and in combination with the first or the second possible implementation mode, the determination subunit is configured to, when i=1, determine the multipath component signal corresponding to the maximum power value of the power spectrum of the correlation sequence as the ith first multipath component signal of the power spectrum of the correlation sequence according to the pre-set determination policy; and when i>1, after removing the first to the (i−1)th first multipath component areas in the power spectrum of the correlation sequence, in the remaining power spectrum of the correlation sequence, determine the multipath component signal corresponding to the maximum power value of the remaining power spectrum of the correlation sequence as the ith first multipath component signal of the power spectrum of the correlation sequence according to the pre-set determination policy.

According to the fourth possible implementation mode and in combination with the second aspect, the path selection unit includes a first path selection subunit and a second path selection subunit, wherein, the first path selection subunit is configured to, in the first multipath component area, select the multipath component signal whose power is greater than the first noise threshold G1 as the valid multipath component signal, and select the multipath component signal whose power is less than the first noise threshold G1 as an invalid multipath component signal;

the second path selection subunit is configured to, in the second multipath component area, select the multipath component signal whose power is greater than the second noise threshold G2 as the valid multipath component signal, and select the multipath component signal whose power is less than the second noise threshold G2 as an invalid multipath component signal.

The disclosure also provides a storage medium having a computer program stored therein, wherein the computer program is configured to execute the above multipath selection methods.

The disclosure provides a multipath selection method and device to perform, via different noise thresholds, a valid multipath selection on a strong multipath component and its corresponding continuation area and a non-strong multipath component and its corresponding continuation area, thereby improving selection accuracy and SNR of multipath component.

DETAILED DESCRIPTION

The technical solutions in the embodiments of the disclosure are described below clearly and completely in combination with the accompanying drawings.

Figure 1:
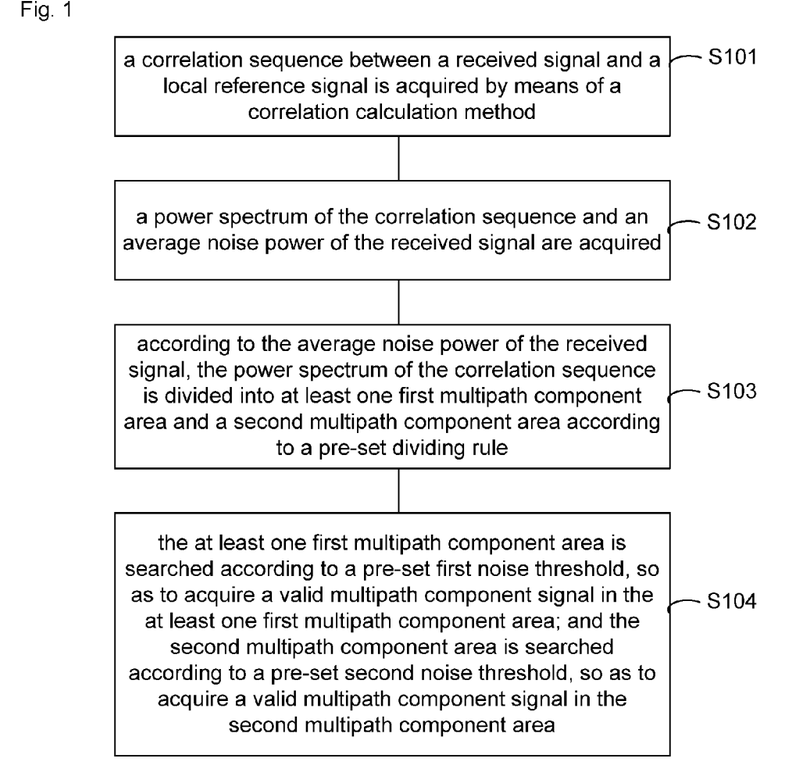
FIG. 1 is a flowchart showing a multipath selection method provided by an embodiment of the disclosure.

FIG. 1 is the flow showing a multipath selection method provided by an embodiment of the disclosure, which can be applied to a receiver side in a communication or radar system. Taking the communication system as an example, the receiver can be UE, a base station and other devices with signal receiving capability, which is not specifically limited by the disclosure. The method may include the following steps.

Step 101: a correlation sequence between a received signal and a local reference signal is acquired by means of a correlation calculation method.

It is noted that, the received signal includes at least one multipath component signal. Therefore, the correlation calculation between the received signal and the local reference signal is essentially to calculate the correlation sequence between multiple multipath component signals in the received signal and the local reference signal. In the present embodiment, the local reference signal can be a local scrambling code, which is not specifically limited by the disclosure.

Exemplarily, before the correlation calculation is performed on the received signal and the local reference signal, the local reference signal and the received signal are sampled respectively. The specific sampling process may include that:

first, the local reference signal is sampled, so as to acquire a sampling point sequence of the local reference signal which is composed of M sampling points of the local reference signal;

then, the sampling point sequence of at least one multipath component signal in the received signal is acquired by performing sliding window sampling on the received signal; in the present embodiment, the received signal is first sampled to obtain N=m+M−1 sampling points of the received signal, wherein m is the number of the multipath component signals included in the received signal; it can be understandable that m can also denote the number of multipath delays of the multipath component signals, and one multipath component signal corresponds to one multipath component signal delay; then, the sampling point sequence of m multipath component signals included in the received signal is acquired by sliding a sliding window with a length of M from the start sampling point of the received signal to each sampling point, wherein each sampling point sequence of the multipath component signal includes M sampling points;

at last, by means of the correlation calculation method, the correlation sequence between the received signal and the local reference signal is acquired according to the sampling point sequence of m multipath component signals included in the received signal and the sampling point sequence of the local reference signal; specifically, in the present embodiment, the sampling point sequence of m multipath component signals can be formed into a first m×M matrix, and then the matrix is pre-multiplied by the conjugate of the sampling point sequence of the local reference signal, so as to acquire the correlation sequence between the received signal and the local reference signal, wherein the length of the correlation sequence is m×1.

In the present embodiment, m is preferably 64, and M is preferably 256.

Step 102: a power spectrum of the correlation sequence and an average noise power of the received signal are acquired.

Figure 2:
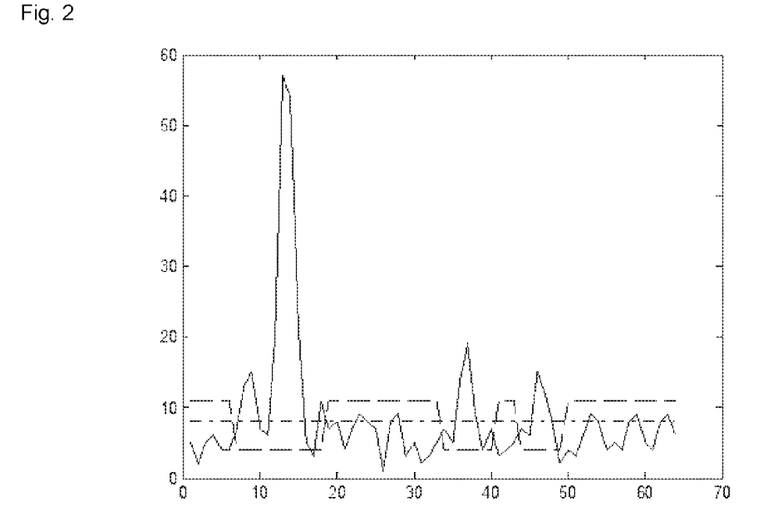
FIG. 2 is a power spectrum of a correlation sequence provided by an embodiment of the disclosure.

It is noted that, the power spectrum of the correlation sequence can be acquired by performing point multiplication on the correlation sequence; in the present embodiment, the power spectrum of the correlation sequence obtained by simulating a VA120 channel can be shown as in FIG. 2; in the power spectrum shown in FIG. 2, the horizontal axis denotes delay sequence numbers of the multipath component signals, namely the sequence numbers of the multipath component signals, the vertical axis denotes the power of the multipath component signal corresponding to the specific delay sequence number, whose unit is decibel (dB), and the solid line is a waveform of the power spectrum of the correlation sequence.

Noise is inevitably introduced in the received signal because of the influence from a receiving filter, a transmitting filter and a wireless transmission channel, so it is required to acquire the average noise power of the received signal. Acquiring the average noise power of the received signal is the conventional technical means of those skilled in the art, so it will not be elaborated here.

Step 103: according to the average noise power of the received signal, the power spectrum of the correlation sequence is divided into at least one first multipath component area and a second multipath component area according to a pre-set dividing rule.

Figure 3:
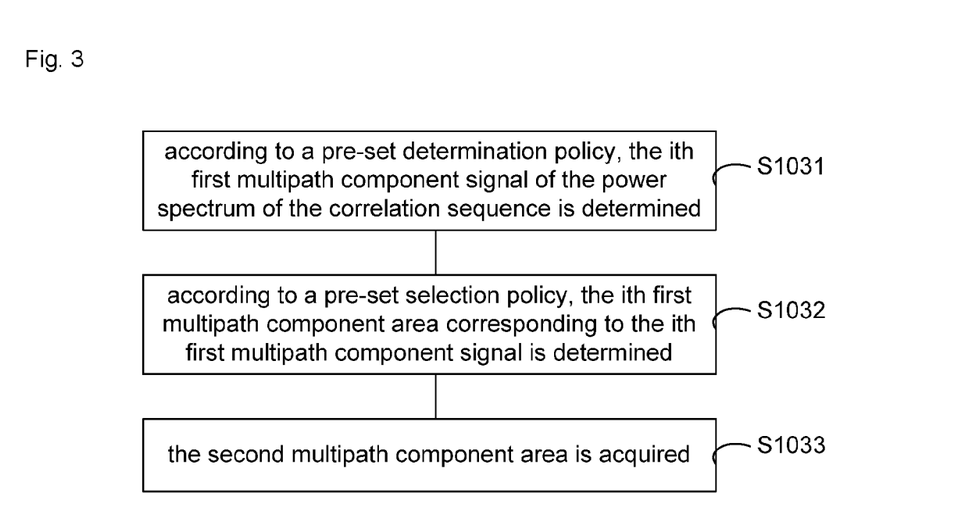
FIG. 3 is a schematic diagram illustrating a method for dividing a first multipath component area and a second multipath component area provided by an embodiment of the disclosure.

Exemplarily, referring to FIG. 3, Step 103 may include Step 1031 to Step 1033.

Step 1031: according to a pre-set determination policy, the ith first multipath component signal of the power spectrum of the correlation sequence is determined.

As an implementation mode, i denotes the sequence number of the first multipath component signal, and is a positive integer;

when i=1, the ith first multipath component signal of the power spectrum of the correlation sequence can be determined by determining the multipath component signal corresponding to the maximum power value of the power spectrum of the correlation sequence according to the pre-set determination policy. In the present embodiment, the pre-set determination policy may include that: when the ratio of the maximum power value of the power spectrum of the correlation sequence to the average noise power is greater than a first determination threshold TH1, or is less than the first determination threshold TH1 but greater than a second determination threshold TH2, or is less than the second determination threshold TH2 but greater than a third determination threshold TH3, the multipath component signal corresponding to the maximum power value of the power spectrum of the correlation sequence is the first multipath component signal; wherein, TH1>TH2>TH3>0.

It is noted that, the number of the determination thresholds and the specific values of the determination thresholds can be determined according to historical data, and/or empirical rules, and/or priori knowledges, which is not limited by the present embodiment. The first determination threshold TH1, the second determination threshold TH2 and the third determination threshold TH3 mentioned in the present embodiment are only used for illustrating the specific technical solutions of the present embodiment and not intended to form any specific limit.

When i>1, the ith first multipath component signal of the power spectrum of the correlation sequence can be determined by determining, after removing the first to the (i−1)th first multipath component areas in the power spectrum of the correlation sequence, the multipath component signal corresponding to the maximum power value of the remaining power spectrum of the correlation sequence in the remaining power spectrum of the correlation sequence according to the pre-set determination policy. The specific process will not be elaborated here.

Step 1032: according to a pre-set selection policy, the ith first multipath component area corresponding to the ith first multipath component signal is determined.

It is noted that, in the present embodiment, the pre-set selection policy corresponds to the determination policy.

Specifically, when the ratio of the power of the first multipath component signal to the average noise power is greater than the first determination threshold TH1, an area which centres on the first multipath component and has a width of $2 \times N_1 + 1$ is selected in the power spectrum of the correlation sequence as the first multipath component area corresponding to the first multipath component signal.

When the ratio of the power of the first multipath component signal to the average noise power is less than the first determination threshold TH1 but greater than the second determination threshold TH2, an area which centres on the first multipath component and has a width of $2 \times N_2 + 1$ is selected as the first multipath component area corresponding to the first multipath component signal.

When the ratio of the power of the first multipath component signal to the average noise power is less than the second determination threshold TH2 but greater than the third determination threshold TH3, an area which centres on the first multipath component and has a width of $2 \times N_3 + 1$ is selected as the first multipath component area corresponding to the first multipath component signal.

Herein, $N_1 > N_2 > N_3$, and all of the $N_1$, $N_2$ and $N_3$ are positive integers.

It is noted that, after the ith first multipath component area is determined each time, the ith first multipath component area can be removed. For example, all the power values in the area can be set 0. Then, the (i+1)th first multipath component signal and the (i+1)th first multipath component area corresponding to the (i+1)th first multipath component signal of the power spectrum of the correlation sequence are determined from the remaining power spectrum according to Step 1031 and Step 1032.

Step 1033: the second multipath component area is acquired.

As an implementation mode, after all the first multipath component areas or the pre-set numbers of the first multipath component areas of the power spectrum of the correlation sequence are determined according to Step 1031 and Step 1032, the area of the remaining power spectrum of the correlation sequence is the second multipath component area.

Step 104: the at least one first multipath component area is searched according to a pre-set first noise threshold, so as to acquire a valid multipath component signal in the at least one first multipath component area; and the second multipath component area is searched according to a pre-set second noise threshold, so as to acquire a valid multipath component signal in the second multipath component area.

Exemplarily, after the first multipath component area and the second multipath component area are acquired, it is needed to select the valid multipath component signals in the two multipath component areas. Since the power of the first multipath component signal corresponding to the first multipath component area is generally higher, understandably, the possibility that there are more valid multipath component signals in the area is high. Since the power of the multipath component signal in the second multipath component area is generally lower, the possibility that there are more valid multipath component signals in the area is low.

Thus, in the present embodiment, in the first multipath component area, the multipath component signal whose power is greater than the first noise threshold G1 is the valid multipath component signal, and the multipath component signal whose power is less than the first noise threshold G1 is an invalid multipath component signal. In the present embodiment, the valid multipath component signal and the invalid multipath component signal can be expressed in the form of mask table. For example, a mapping table is established in which the mark numbers of elements in the table correspond to the sequence numbers of the multipath component signals. When the multipath component signal is the valid multipath component signal, the element with the mark number corresponding to the multipath component signal in the mapping table is set as 1. When the multipath component signal is the invalid multipath component signal, the element with the mark number corresponding to the multipath component signal in the mapping table is set as 0.

In the second multipath component area, the multipath component signal whose power is greater than the second noise threshold G2 is the valid multipath component signal, and the multipath component signal whose power is less than the second noise threshold G2 is an invalid multipath component signal. In the present embodiment, the valid multipath component signal and the invalid multipath component signal are expressed in the form of mask table. In the mark table, when the multipath component signal is the valid multipath component signal, the element with the mark number corresponding to the multipath component signal in the mapping table is set as 1. When the multipath component signal is the invalid multipath component signal, the element with the mark number corresponding to the multipath component signal in the mapping table is set as 0.

The mask table obtained through Step 104 can represent a selection result of the multipath component signal. Since two thresholds are specifically set according to the power characteristics of the multipath component signal in the whole multipath selection process, the selection accuracy of the multipath component can be improved. As shown in FIG. 2, the dotted lines denote the noise thresholds corresponding to the first multipath component area and the second multipath component area respectively. It can be seen that the first noise threshold is lower than the second noise threshold. That is there are more signal components because in the first multipath component area. Therefore, for keeping more signal components, it is needed to set a lower threshold to avoid mistaking the signal component for noise. In the second multipath component area, there are more noise components. Therefore, for eliminating more noise components, it is needed to set a higher threshold to avoid mistaking the noise component for signal.

Figure 4:
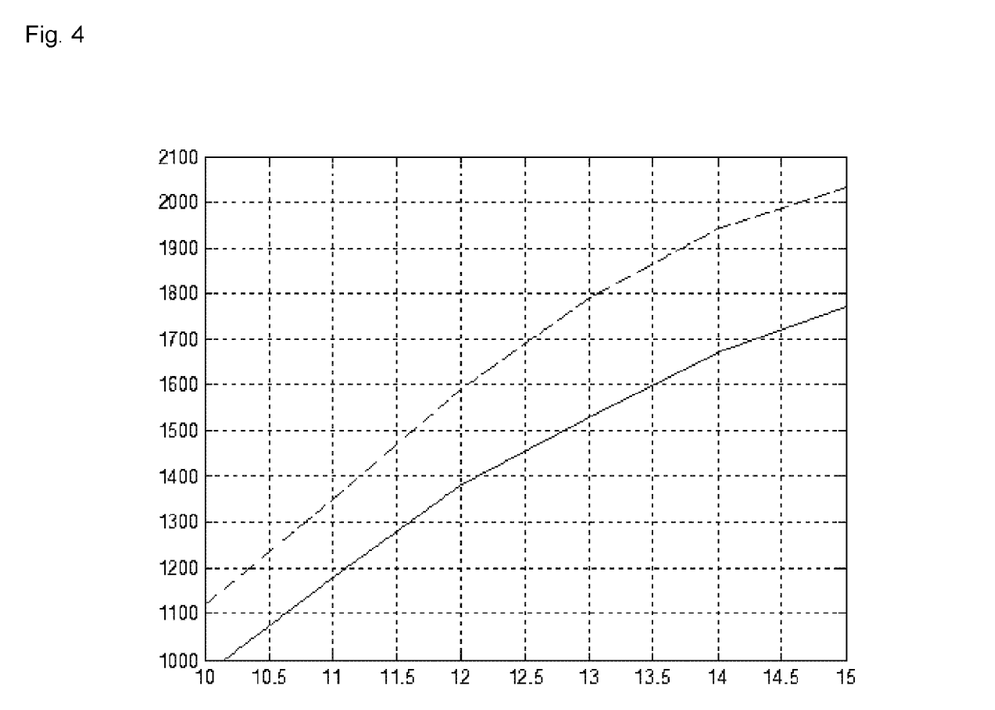
FIG. 4 is an effect comparison diagram provided by an embodiment of the disclosure.

At last, the present embodiment compares the multipath selection method including Step 101 to Step 104 with the conventional method that performs multipath selection by adopting a fixed threshold. As shown in FIG. 2, the dash dot line denotes the fixed threshold adopted in the conventional method. It can be seen from FIG. 2 that adopting the fixed threshold to select will cause that some first multipath component areas with more signal components are mistaken for noises while some second multipath components with more noise components are mistaken for signals. The specific effect comparison is shown in FIG. 4. In FIG. 4, the horizontal axis denotes the SNR in dB, the vertical axis denotes the throughput rate in kbps, the dotted line indicates the effect of the method provided by the present embodiment and the solid line indicates the effect of the conventional method using the single fixed threshold. It can be seen that compared with the conventional method, the method provided by the present embodiment has a higher throughput rate, which means that more data can be transmitted, and the method provided by the present embodiment has a better throughput performance.

According to the multipath selection method provided by the present embodiment, a valid multipath selection is performed on a strong multipath component and its corresponding continuation area and a non-strong multipath component and its corresponding continuation area by adopting different noise thresholds, thereby improving selection accuracy and SNR of multipath component.

Figure 5:
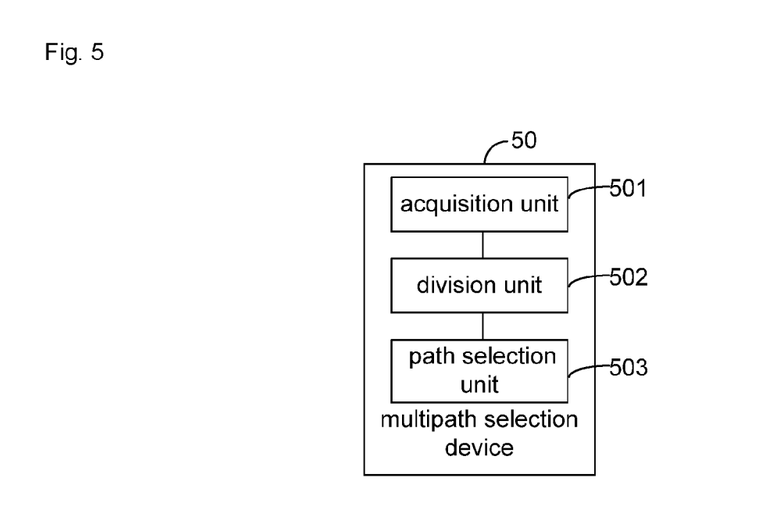
FIG. 5 is a structure diagram illustrating a multipath selection device provided by an embodiment of the disclosure.

FIG. 5 shows a multipath selection device 50 provided by the disclosure, which can be applied to the rear end of a receiving device such as antennas to select the multipath component signals in the received signal. The multipath selection device may include an acquisition unit 501, a division unit 502 and a path selection unit 503.

The acquisition unit 501 is configured to acquire the correlation sequence between the received signal and the local reference signal by means of the correlation calculation method, and acquire the power spectrum of the correlation sequence and the average noise power of the received signal.

The division unit 502 is configured to, according to the average noise power of the received signal, divide the power spectrum of the correlation sequence into at least one first multipath component area and the second multipath component area according to the pre-set dividing rule.

The path selection unit 503 is configured to search the at least one first multipath component area according to the pre-set first noise threshold, so as to acquire the valid multipath component signal in the at least one first multipath component area, and search the second multipath component area according to the pre-set second noise threshold, so as to acquire the valid multipath component signal in the second multipath component area.

Exemplarily, the acquisition unit 501 is further configured to, before performing relevant calculation on the received signal and the local reference signal, sample the local reference signal and the received signal respectively. Specifically, the acquisition unit 501 is configured to sample the local reference signal, and acquire a sampling point sequence of the local reference signal which is composed of M sampling points of the local reference signal, and acquire the sampling point sequence of at least one multipath component signal in the received signal by performing sliding window sampling on the received signal. In the present embodiment, first the acquisition unit 501 samples the received signal to obtain N=m+M−1 sampling points of the received signal, wherein m is the number of the multipath component signals included in the received signal; it can be understandable that m can also denote the number of multipath delays of the multipath component signal, and one multipath component signal corresponds to one multipath component signal delay; then, the acquisition unit 501 acquires the sampling point sequence of m multipath component signals included in the received signal by sliding a sliding window with a length of M from the start sampling point of the received signal to each sampling point, wherein each sampling point sequence of the multipath component signal includes M sampling points.

After sampling the local reference signal and the received signal, the acquisition unit 501 acquires, by means of the correlation calculation method, the correlation sequence between the received signal and the local reference signal according to the sampling point sequence of m multipath component signals included in the received signal and the sampling point sequence of the local reference signal; specifically, in the present embodiment, the acquisition unit 501 can form the sampling point sequence of m multipath component signals into a first m×M matrix, and then pre-multiplies the matrix by the conjugate of the sampling point sequence of the local reference signal, so as to acquire the correlation sequence between the received signal and the local reference signal, wherein the length of the correlation sequence is m×1.

In the present embodiment, m is preferably 64, and M is preferably 256.

It is noted that, the power spectrum of the correlation sequence can be acquired by performing point multiplication on the correlation sequence; in the present embodiment, the power spectrum of the correlation sequence obtained by simulating the VA120 channel can be shown as FIG. 2; in the power spectrum shown in FIG. 2, the horizontal axis denotes delay sequence numbers of the multipath component signals, namely the sequence numbers of the multipath component signals, the vertical axis denotes the power of the multipath component signal corresponding to the specific delay sequence number, whose unit is dB, and the solid line is the waveform of the power spectrum of the correlation sequence.

Noise is inevitably introduced in the received signal because of the influence from the receiving filter, the transmitting filter and the wireless transmission channel, so it is required to acquire the average noise power of the received signal. Acquiring the average noise power of the received signal is the conventional technical means of those skilled in the art, so it will not be elaborated here.

Figure 6:
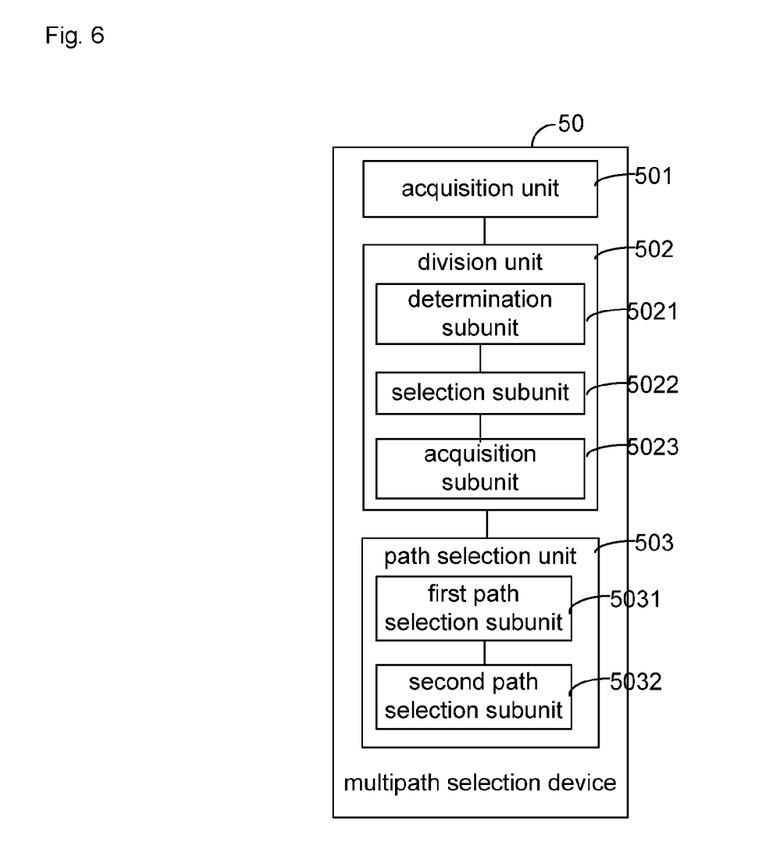
FIG. 6 is a structure diagram illustrating another multipath selection device provided by an embodiment of the disclosure.

Exemplarily, referring to FIG. 6, the division unit 502 may include a determination subunit 5021, a selection subunit 5022 and an acquisition subunit 5023.

The determination subunit 5021 is configured to, according to the pre-set determination policy, determine the ith first multipath component signal of the power spectrum of the correlation sequence, wherein i denotes the sequence number of the first multipath component signal, and is a positive integer.

Specifically, the pre-set determination policy includes that: when the ratio of the maximum power value of the power spectrum of the correlation sequence to the average noise power is greater than the first determination threshold TH1, or is less than the first determination threshold TH1 but greater than the second determination threshold TH2, or is less than the second determination threshold TH2 but greater than the third determination threshold TH3, the multipath component signal corresponding to the maximum power value of the power spectrum of the correlation sequence is the first multipath component signal; wherein, TH1>TH2>TH3>0;

it is noted that, the number of the determination thresholds and the specific values of the determination thresholds can be determined according to historical data, and/or empirical rules, and/or priori knowledges, which is not limited by the present embodiment. The first determination threshold TH1, the second determination threshold TH2 and the third determination threshold TH3 mentioned in the present embodiment are only used for illustrating the specific technical solutions of the present embodiment and not intended to form any specific limit.

As an implementation mode, the determination subunit 5021 is configured to, when i=1, determine the multipath component signal corresponding to the maximum power value of the power spectrum of the correlation sequence as the ith first multipath component signal of the power spectrum of the correlation sequence according to the pre-set determination policy, and when i>1, after removing the first to the (i−1)th first multipath component areas in the power spectrum of the correlation sequence, in the remaining power spectrum of the correlation sequence, determine the multipath component signal corresponding to the maximum power value of the remaining power spectrum of the correlation sequence as the ith first multipath component signal of the power spectrum of the correlation sequence according to the pre-set determination policy.

The selection subunit 5022 is configured to, according to the pre-set selection policy, determine the ith first multipath component area corresponding to the ith first multipath component signal.

It is noted that, in the present embodiment, the pre-set selection policy corresponds to the determination policy.

Specifically, when the ratio of the power of the first multipath component signal to the average noise power is greater than the first determination threshold TH1, the area which centres on the first multipath component and has a width of $2\times N_1+1$ is selected in the power spectrum of the correlation sequence as the first multipath component area corresponding to the first multipath component signal.

When the ratio of the power of the first multipath component signal to the average noise power is less than the first determination threshold TH1 but greater than the second determination threshold TH2, an area which centres on the first multipath component and has a width of $2\times N_2+1$ is selected as the first multipath component area corresponding to the first multipath component signal.

When the ratio of the power of the first multipath component signal to the average noise power is less than the second determination threshold TH2 but greater than the third determination threshold TH3, an area which centres on the first multipath component and has a width of $2\times N_3+1$ is selected as the first multipath component area corresponding to the first multipath component signal.

Herein, $N_1>N_2>N_3$, and all of the $N_1$, $N_2$ and $N_3$ are positive integers.

It is noted that, after determining the ith first multipath component area each time, the selection subunit 5022 can remove the ith first multipath component area. For example, the selection subunit 5022 may set all the power values in the area as 0. Then, from the remaining power spectrum, the (i+1)th first multipath component signal of the power spectrum of the correlation sequence is determined by the determination subunit 5021, and the (i+1)th first multipath component area corresponding to the (i+1)th first multipath component signal is determined by the selection subunit 5022.

The acquisition subunit 5023 is configured to acquire the second multipath component area.

As an implementation mode, after all the first multipath component areas or the pre-set numbers of the first multipath component areas of the power spectrum of the correlation sequence are determined by the determination subunit 5021 and the selection subunit 5022, the acquisition subunit 5023 determines the area of the remaining power spectrum of the correlation sequence as the second multipath component area.

Exemplarily, after the division unit 502 divides the first multipath component area and the second multipath component area, the path selection unit 503 selects the valid multipath component signals in the two multipath component areas respectively. Since the power of the first multipath component signal corresponding to the first multipath component area is generally higher, understandably, the possibility that there are more valid multipath component signals in the area is high. Since the power of the multipath component signal in the second multipath component area is generally lower, the possibility that there are more valid multipath component signals in the area is low.

Thus, in the present embodiment, as shown in FIG. 6, the path selection unit 503 includes a first path selection subunit 5031 and a second path selection subunit 5023.

The first path selection subunit 5031 is configured to, in the first multipath component area, select the multipath component signal whose power is greater than the first noise threshold G1 as the valid multipath component signal, and select the multipath component signal whose power is less than the first noise threshold G1 as the invalid multipath component signal. In the present embodiment, the first path selection subunit 5031 can express the valid multipath component signal and the invalid multipath component signal in the form of mask table. For example, the first path selection subunit 5031 establishes a mapping table in which the mark numbers of elements in the table correspond to the sequence numbers of the multipath component signals. When the multipath component signal is the valid multipath component signal, the first path selection subunit 5031 sets the element with the mark number corresponding to the multipath component signal in the mapping table as 1. When the multipath component signal is the invalid multipath component signal, the first path selection subunit 5031 sets the element with the mark number corresponding to the multipath component signal in the mapping table as 0.

The second path selection subunit 5032 is configured to, in the second multipath component area, select the multipath component signal whose power is greater than the second noise threshold G2 as the valid multipath component signal, and select the multipath component signal whose power is less than the second noise threshold G2 as the invalid multipath component signal. In the present embodiment, the second path selection subunit 5032 can also express the valid multipath component signal and the invalid multipath component signal in the form of mask table. In the mark table, when the multipath component signal is the valid multipath component signal, the second path selection subunit 5032 sets the element with the mark number corresponding to the multipath component signal in the mapping table as 1. When the multipath component signal is the invalid multipath component signal, the second path selection subunit 5032 sets the element with the mark number corresponding to the multipath component signal in the mapping table as 0.

According to the multipath selection device 50 provided by the present embodiment, a valid multipath selection is performed on the strong multipath component and its corresponding continuation area and the non-strong multipath component and its corresponding continuation area by adopting different noise thresholds, thereby improving selection accuracy and SNR of multipath component.

The present disclosure also provides a storage medium having a computer program stored. The computer program is configured to execute the above multipath selection method.

Those skilled in the art should appreciate that the embodiments of the disclosure can be provided as a method, a system or a computer program product. Therefore, this disclosure can adopt the forms of hardware embodiment, software embodiment, or a combination thereof. In addition, this disclosure can adopt the form of a computer program product which is implemented on one or more computer available storage media including computer available program codes, wherein the storage media include, but are not limited to, a magnetic disk memory, a Compact Disc-ROM (CD-ROM), and so on.

This disclosure is described according to the flowcharts and/or block diagrams of the method, the device (system) and the computer program product in the embodiments of this disclosure. It should be understood that each flow and/or block in the flowchart and/or block diagram, and the combination of the flow and/or block in the flowchart and/or block diagram can be implemented by the computer program instructions. These computer program instructions can be provided to the processing unit of the general-purpose computer, the special-purpose computer, the embedded processor or other programmable data processing equipment to generate a machine, so that instructions which are executed by the processing unit of the computer or other programmable data processing equipment generate the device which is used for implementing the specified functions in one or more flows of the flowchart and/or one or more blocks of the block diagram.

These computer program instructions can also be stored in the computer-readable memory which can guide the computer or other programmable data processing equipment to work in a particular way, so that the instructions stored in the computer-readable memory generate the product including the instruction device, wherein the instruction device implements the specified functions in one or more flows of the flowchart and/or one or more blocks of the block diagram.

These computer program instructions can also be loaded on the computer or other programmable data processing equipment, so that a series of operation steps are performed on the computer or other programmable data processing equipment to generate the processing implemented by the computer, and the instructions executed on the computer or other programmable data processing equipment provide the steps for implementing the specified functions in one or more flows of the flowchart and/or one or more blocks of the block diagram.

The above is only the preferred embodiments of the disclosure and is not intended to limit the scope of the claims of the disclosure.

INDUSTRIAL APPLICABILITY

The disclosure performs, via different noise thresholds, a valid multipath selection on a strong multipath component and its corresponding continuation area and a non-strong multipath component and its corresponding continuation area, thereby improving selection accuracy and SNR of multipath component.

The invention claimed is:

1. A multipath selection method, comprising:
acquiring a correlation sequence between a received signal and a local reference signal by a correlation calculation method;
acquiring a power spectrum of the correlation sequence and an average noise power of the received signal;
according to the average noise power of the received signal, dividing the power spectrum of the correlation sequence into at least one first multipath component area and a second multipath component area according to a pre-set dividing rule;
searching the at least one first multipath component area according to a pre-set first noise threshold, so as to acquire a valid multipath component signal in the at least one first multipath component area; and
searching the second multipath component area according to a pre-set second noise threshold, so as to acquire a valid multipath component signal in the second multipath component area.

2. The method according to claim 1, wherein according to the average noise power of the received signal, dividing the power spectrum of the correlation sequence into at least one first multipath component area and the second multipath component area according to the pre-set dividing rule comprises:
according to a pre-set determination policy, determining the ith first multipath component signal of the power spectrum of the correlation sequence, wherein i denotes the sequence number of the first multipath component signal, and is a positive integer;
according to a pre-set selection policy, determining the ith first multipath component area corresponding to the ith first multipath component signal; and
acquiring the second multipath component area.

3. The method according to claim 2, wherein,
the pre-set determination policy comprises: when a ratio of a maximum power value of the power spectrum of the correlation sequence to the average noise power is greater than a first determination threshold TH1, or is less than the first determination threshold TH1 but greater than a second determination threshold TH2, or is less than the second determination threshold TH2 but greater than a third determination threshold TH3, the multipath component signal corresponding to the maximum power value of the power spectrum of the correlation sequence is the first multipath component signal, wherein TH1>TH2>TH3>0;
the pre-set selection policy comprises:
when a ratio of the power of the first multipath component signal to the average noise power is greater than the first determination threshold TH1, an area which centres on the first multipath component and has a width of $2 \times N_1+1$ is selected in the power spectrum of the correlation sequence as the first multipath component area corresponding to the first multipath component signal;

when the ratio of the power of the first multipath component signal to the average noise power is less than the first determination threshold TH1 but greater than the second determination threshold TH2, an area which centres on the first multipath component and has a width of $2 \times N_2+1$ is selected as the first multipath component area corresponding to the first multipath component signal; and, when the ratio of the power of the first multipath component signal to the average noise power is less than the second determination threshold TH2 but greater than the third determination threshold TH3, an area which centres on the first multipath component and has a width of $2 \times N_3+1$ is selected as the first multipath component area corresponding to the first multipath component signal, wherein $N_1 > N_2 > N_3$, and all of the $N_1$, $N_2$ and $N_3$ are positive integers.

4. The method according to claim 2, wherein determining the ith first multipath component signal of the power spectrum of the correlation sequence according to the pre-set determination policy comprises:

when i=1, determining the multipath component signal corresponding to the maximum power value of the power spectrum of the correlation sequence as the ith first multipath component signal of the power spectrum of the correlation sequence according to the pre-set determination policy;

when i>1, after removing the first to the (i−1)th first multipath component areas in the power spectrum of the correlation sequence, determining the multipath component signal corresponding to the maximum power value of the remaining power spectrum of the correlation sequence as the ith first multipath component signal of the power spectrum of the correlation sequence according to the pre-set determination policy.

5. The method according to claim 1, wherein searching the at least one first multipath component area according to the pre-set first noise threshold, so as to acquire the valid multipath component signal in the at least one first multipath component area, and searching the second multipath component area according to the pre-set second noise threshold, so as to acquire the valid multipath component signal in the second multipath component area comprises:

in the first multipath component area, the multipath component signal whose power is greater than a first noise threshold G1 is the valid multipath component signal, and the multipath component signal whose power is less than the first noise threshold G1 is an invalid multipath component signal;

in the second multipath component area, the multipath component signal whose power is greater than a second noise threshold G2 is the valid multipath component signal, and the multipath component signal whose power is less than the second noise threshold G2 is an invalid multipath component signal.

6. A multipath selection device, comprising: an acquisition unit, a division unit and a path selection unit, wherein, the acquisition unit is configured to acquire a correlation sequence between a received signal and a local reference signal by a correlation calculation method, and acquire a power spectrum of the correlation sequence and an average noise power of the received signal;

the division unit is configured to, according to the average noise power of the received signal, divide the power spectrum of the correlation sequence into at least one first multipath component area and a second multipath component area according to a pre-set dividing rule; and the path selection unit is configured to search the at least one first multipath component area according to a pre-set first noise threshold, so as to acquire a valid multipath component signal in the at least one first multipath component area, and search the second multipath component area according to a pre-set second noise threshold, so as to acquire a valid multipath component signal in the second multipath component area.

7. The device according to claim 6, wherein the division unit comprises: a determination subunit, a selection subunit and an acquisition subunit, the determination subunit is configured to, according to a pre-set determination policy, determine the ith first multipath component signal of the power spectrum of the correlation sequence, wherein i denotes the sequence number of the first multipath component signal, and is a positive integer;

the selection subunit is configured to, according to a pre-set selection policy, determine the ith first multipath component area corresponding to the ith first multipath component signal; and the acquisition subunit is configured to acquire the second multipath component area.

8. The device according to claim 7, wherein, the pre-set determination policy comprises: when a ratio of a maximum power value of the power spectrum of the correlation sequence to the average noise power is greater than a first determination threshold TH1, or is less than the first determination threshold TH1 but greater than a second determination threshold TH2, or is less than the second determination threshold TH2 but greater than a third determination threshold TH3, the multipath component signal corresponding to the maximum power value of the power spectrum of the correlation sequence is the first multipath component signal, wherein TH1>TH2>TH3>0;

the pre-set selection policy comprises:

when a ratio of the power of the first multipath component signal to the average noise power is greater than the first determination threshold TH1, an area which centres on the first multipath component and has a width of $2 \times N_1+1$ is selected in the power spectrum of the correlation sequence as the first multipath component area corresponding to the first multipath component signal;

when the ratio of the power of the first multipath component signal to the average noise power is less than the first determination threshold TH1 but greater than the second determination threshold TH2, an area which centres on the first multipath component and has a width of $2 \times N_2+1$ is selected as the first multipath component area corresponding to the first multipath component signal; and when the ratio of the power of the first multipath component signal to the average noise power is less than the second determination threshold TH2 but greater than the third determination threshold TH3, an area which centres on the first multipath component and has a width of 2×N₃+1 is selected as the first multipath component area corresponding to the first multipath component signal, wherein $N_1 > N_2 > N_3$, and all of the $N_1$, $N_2$ and $N_3$ are positive integers.

9. The device according to claim 7, wherein the determination subunit is configured to, when i=1, determine the multipath component signal corresponding to the maximum power value of the power spectrum of the correlation sequence as the ith first multipath component signal of the power spectrum of the correlation sequence according to the pre-set determination policy; and when i>1, after removing the first to the (i−1)th first multipath component areas in the power spectrum of the correlation sequence, determine the multipath component signal corresponding to the maximum power value of the remaining power spectrum of the correlation sequence as the ith first multipath component signal of the power spectrum of the correlation sequence according to the pre-set determination policy.

10. The device according to claim 6, wherein the path selection unit comprises a first path selection subunit and a second path selection subunit, the first path selection subunit is configured to, in the first multipath component area, select the multipath component signal whose power is greater than a first noise threshold G1 as the valid multipath component signal, and select the multipath component signal whose power is less than the first noise threshold G1 as an invalid multipath component signal; and the second path selection subunit is configured to, in the second multipath component area, select the multipath component signal whose power is greater than a second noise threshold G2 as the valid multipath component signal, and select the multipath component signal whose power is less than the second noise threshold G2 as an invalid multipath component signal.

11. A non-transitory computer-readable storage medium having a computer program stored therein, wherein the computer program is configured to execute a multipath selection method, comprising:

acquiring a correlation sequence between a received signal and a local reference signal by a correlation calculation method;

acquiring a power spectrum of the correlation sequence and an average noise power of the received signal;

according to the average noise power of the received signal, dividing the power spectrum of the correlation sequence into at least one first multipath component area and a second multipath component area according to a pre-set dividing rule;

searching the at least one first multipath component area according to a pre-set first noise threshold, so as to acquire a valid multipath component signal in the at least one first multipath component area; and searching the second multipath component area according to a pre-set second noise threshold, so as to acquire a valid multipath component signal in the second multipath component area.

12. The method according to claim 3, wherein determining the ith first multipath component signal of the power spectrum of the correlation sequence according to the pre-set determination policy comprises:

when i=1, determining the multipath component signal corresponding to the maximum power value of the power spectrum of the correlation sequence as the ith first multipath component signal of the power spectrum of the correlation sequence according to the pre-set determination policy;

when i>1, after removing the first to the (i−1)th first multipath component areas in the power spectrum of the correlation sequence, determining the multipath component signal corresponding to the maximum power value of the remaining power spectrum of the correlation sequence as the ith first multipath component signal of the power spectrum of the correlation sequence according to the pre-set determination policy.

13. The device according to claim 8, wherein the determination subunit is configured to, when i=1, determine the multipath component signal corresponding to the maximum power value of the power spectrum of the correlation sequence as the ith first multipath component signal of the power spectrum of the correlation sequence according to the pre-set determination policy; and when i>1, after removing the first to the (i−1)th first multipath component areas in the power spectrum of the correlation sequence, determine the multipath component signal corresponding to the maximum power value of the remaining power spectrum of the correlation sequence as the ith first multipath component signal of the power spectrum of the correlation sequence according to the pre-set determination policy.

* * * * *